United States Patent
Queru et al.

(10) Patent No.: US 8,265,919 B1
(45) Date of Patent: Sep. 11, 2012

(54) EMULATING A PERIPHERAL MASS STORAGE DEVICE WITH A PORTABLE DEVICE

(75) Inventors: Jean Baptiste Maurice Queru, Foster City, CA (US); Christopher L. Tate, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,671

(22) Filed: Sep. 30, 2011

Related U.S. Application Data

(63) Continuation of application No. 13/208,596, filed on Aug. 12, 2011.

(60) Provisional application No. 61/373,373, filed on Aug. 13, 2010.

(51) Int. Cl.
| | | |
|---|---|---|
| G06F 17/50 | (2006.01) | |
| G06F 9/44 | (2006.01) | |
| G06F 13/10 | (2006.01) | |
| G06F 13/12 | (2006.01) | |
| G06F 9/45 | (2006.01) | |
| G06F 9/455 | (2006.01) | |
| G06G 7/62 | (2006.01) | |
| G06G 7/54 | (2006.01) | |

(52) U.S. Cl. ........... 703/14; 703/13; 703/15; 703/16; 703/17; 703/18; 703/19; 703/20; 703/21; 703/23

(58) Field of Classification Search ........... 703/13–23
See application file for complete search history.

(56) References Cited

U.S. PATENT DOCUMENTS

| | | | |
|---|---|---|---|
| 6,208,999 B1 | 3/2001 | Spilo et al. | |
| 6,330,653 B1 * | 12/2001 | Murray et al. | 711/173 |
| 6,697,846 B1 | 2/2004 | Soltis | |
| 7,024,427 B2 * | 4/2006 | Bobbitt et al. | 1/1 |
| 7,069,594 B1 | 6/2006 | Bolin | |
| 7,146,306 B2 * | 12/2006 | Whitney | 703/24 |
| 7,222,212 B2 * | 5/2007 | Lee et al. | 710/315 |
| 7,266,555 B1 | 9/2007 | Coates et al. | |
| 7,389,393 B1 | 6/2008 | Karr et al. | |
| 7,392,291 B2 | 6/2008 | Jewett et al. | |
| 7,496,493 B1 * | 2/2009 | Stevens | 703/24 |
| 7,549,044 B2 | 6/2009 | Lee et al. | |
| 7,584,279 B1 | 9/2009 | Chapman | |

(Continued)

OTHER PUBLICATIONS

Brakensiek et al. "Virtualization as an Enabler for Security in Mobile Devices", ACM 2008.*

(Continued)

*Primary Examiner* — Shambhavi Patel
(74) *Attorney, Agent, or Firm* — Fish & Richardson P.C.

(57) ABSTRACT

Methods, systems, and apparatus, including computer programs encoded on a computer storage medium, for emulating a mass storage device and a file system of a mass storage device. In a first aspect, a human-portable data processing device that includes one or more data processors that perform operations in accordance with machine-readable instructions, an incoming message classifier configured to classify an incoming read command according to an address of the data requested by the incoming read command, and an emulation data generation component connected to respond to the classification of the incoming read command by the incoming message classifier to generate emulation data emulating that which would have been read by the incoming read command were the human-portable data processing device a mass storage device; and a bus controller configured to respond to the incoming read command with the emulation data generated by the emulation data generation component.

19 Claims, 3 Drawing Sheets

U.S. PATENT DOCUMENTS

| | | | |
|---|---|---|---|
| 7,702,821 B2 | 4/2010 | Feinberg et al. | |
| 7,739,444 B2 | 6/2010 | Sinclair et al. | |
| 7,925,802 B2* | 4/2011 | Lauterbach et al. | 710/38 |
| 2005/0144353 A1* | 6/2005 | Long et al. | 711/100 |
| 2006/0123062 A1 | 6/2006 | Bobbitt et al. | |
| 2006/0149899 A1 | 7/2006 | Zimmer et al. | |
| 2007/0033326 A1* | 2/2007 | Sinclair | 711/103 |
| 2007/0033373 A1 | 2/2007 | Sinclair | |
| 2007/0100893 A1* | 5/2007 | Sanders | 707/200 |
| 2007/0250594 A1 | 10/2007 | Ohtani | |
| 2008/0082488 A1* | 4/2008 | Terrell | 707/3 |
| 2008/0168118 A1* | 7/2008 | Hickey et al. | 709/201 |
| 2008/0288237 A1* | 11/2008 | Hassan et al. | 703/23 |
| 2008/0294814 A1 | 11/2008 | Gorobets | |
| 2009/0003608 A1 | 1/2009 | Leet et al. | |
| 2009/0013171 A1* | 1/2009 | Gilling | 713/100 |
| 2009/0055556 A1 | 2/2009 | Lachmumd et al. | |
| 2009/0132676 A1 | 5/2009 | Tu et al. | |
| 2009/0172281 A1* | 7/2009 | Jogand-Coulomb et al. | 711/115 |
| 2010/0023672 A1 | 1/2010 | Gorobets et al. | |
| 2010/0042753 A1* | 2/2010 | Whaley et al. | 710/13 |
| 2010/0070544 A1* | 3/2010 | Gopalan et al. | 707/822 |
| 2011/0016466 A1* | 1/2011 | Liu et al. | 718/1 |
| 2011/0205965 A1* | 8/2011 | Sprigg et al. | 370/328 |

OTHER PUBLICATIONS

Hwang et al. "Xen on ARM: System Virtualization using Xen Hypervisor for ARM-based Secure Mobile Phones", IEEE 2008.*

Hiroaki et al. "VIRTUS: A New Processor Virtualization Architecture for Security-Oriented Next-Generation Mobile Terminals", ACM 2006.*

Inoue et al. "Processor Virtualization for Secure Mobile Terminals", ACM Transactions on Design Automation of Electronic Systems, vol. 13, No. 3, Article 48, Pub. date: Jul. 2008.*

Armand et al. "Shared Device Driver Model for Virtualized Mobile Handsets ", ACM 2008.*

Ghodke, Ninad. "Virtualization Techniques to Enable Transparent Access to Peripheral Devices Across Networks", 2004.*

Axelson, Jan. "USB Mass Storage: Designing and Programming Devices and Embedded Hosts." Lakeview Research LLC, 2006, 304 pages.

"Computer Architecture Laboratory, Laboratory 3: (Simple) FAT emulation", 2007 (3 pages) Available at http://www.it.uc3m.es/lablao/2007/lab3/index.html.

* cited by examiner

EMULATING A PERIPHERAL MASS STORAGE DEVICE WITH A PORTABLE DEVICE

CROSS-REFERENCE TO RELATED APPLICATION

This application is a continuation application of U.S. application Ser. No. 13/208,596, filed on Aug. 12, 2011, which claims the benefit under 35 U.S.C. §119(e) of U.S. Provisional Application Ser. No. 61/373,373, filed on Aug. 13, 2010, entitled "Emulating A Peripheral Mass Storage Device With A Portable Device," the entirety of which is hereby incorporated by reference.

BACKGROUND

This specification relates to emulating a mass storage device with a portable device.

A mass storage device is device for storing relatively large amounts of data. Mass storage devices can be peripheral devices in that they are not integrated into a base computer system. Rather, mass storage devices are generally optional devices that are used in conjunction with a base computer system. Mass storage devices are generally easily connectable to and disconnectable from the base computer system using a connection. Examples of peripheral mass storage devices include external magnetic hard drives, external optical drives, portable flash memory devices, digital cameras, digital audio players, portable media players, and flash memory cards. Some mass storage devices may additionally require adaptors to form connections with a base computer system. Some mass storage devices include combinations of functionality. For example, devices such as the Apple iPhone and the Sony Ericsson K800 store data and also act as digital cameras, portable media players, and cellular phones.

Examples of connections include Universal Serial Bus (USB) connections. USB connections are connections that are in accordance with a USB specification. The USB 1.0 specification was introduced in 1996 and the USB 2.0 specification was released in April 2000. USB connections are asymmetric in that a host or master base computer system (usually a desktop or notebook computer) controls the relationship with one or more slave devices. The USB mass storage device class (alternatively referred to as USB Mass Storage Class (MSC) or USB Universal Mass Storage (UMS)) is a set of communications protocols suitable for USB connections. Mass storage devices which support this standard are referred to as MSC or UMS devices. Support for MSC or UMS devices is provided by default in many modern operating systems. As a result, MSC or UMS devices can be accessed from a host device without separate drivers dedicated to particular devices.

Mass storage devices can use a file system to organize directories and files. Examples of file systems include File Allocation Table (FAT) file systems. A FAT is an index that records the physical location of directories and files, and portions of files, on a data storage device. FAT file systems generally includes four different sections, namely, reserved sectors, the FAT region, the root directory region, and the data region. The reserved sectors are located at the very beginning of FAT file systems. The first reserved sector (sector 0) is the Boot Sector and generally includes the BIOS Parameter Block and the operating system's boot loader code. The number of reserved sectors is indicated by a field inside the Boot Sector. For FAT32 file systems, the reserved sectors include a File System Information Sector at sector 1 and a Backup Boot Sector at Sector 6. The FAT region generally includes copies of the File Allocation Table. A File Allocation Table is a map of the data region and indicates which clusters are used by which files and directories. In FAT12 and FAT16, the root directory region is a directory table that stores information about the files and directories located in the root directory. FAT32 stores the root directory in the data region, along with files and other directories. Thus, for FAT32, the data region begins with the root directory region. The data region is where the actual file and directory data is stored. The size of files and subdirectories can be increased by adding links to a file's chain in the FAT.

SUMMARY

This specification describes the emulation of a mass storage device and a file system of a mass storage device.

In a first aspect, a method includes transferring data from a human-portable data processing device to a data processing system. Transferring the data includes classifying, by the human-portable data processing device, an incoming read command according to a section of a file system in which the data requested by the incoming read command would have been found were the file system used at the human-portable data processing device generating, by the human-portable data processing device in response to the incoming read command, emulation data that emulates data which would have been found in the section of the file system, and responding, by the human-portable data processing device, to the incoming read command with a response that includes the emulation data.

In a second aspect, a human-portable data processing device includes one or more data processors that perform operations in accordance with machine-readable instructions. The operations include classifying an incoming read command according to a section of a file system in which the data requested by the incoming read command would have been found were the file system used at the human-portable data processing device, generating, in response to the incoming read command, emulation data that emulates data which would have been found in the section of the file system, and responding to the incoming read command with a response that includes the emulation data.

In a third aspect, a human-portable data processing device that includes one or more data processors that perform operations in accordance with machine-readable instructions, an incoming message classifier configured to classify an incoming read command according to an address of the data requested by the incoming read command, and an emulation data generation component connected to respond to the classification of the incoming read command by the incoming message classifier to generate emulation data emulating that which would have been read by the incoming read command were the human-portable data processing device a mass storage device; and a bus controller configured to respond to the incoming read command with the emulation data generated by the emulation data generation component.

In a fourth aspect, a data processing device includes one or more data processors that perform operations in accordance with machine-readable instructions, a storage medium, and a bus controller configured to respond to a first incoming read command that specifies a first memory address from which responsive data is to be read with data read from an address in the storage medium and respond to a second incoming read command that specifies a second memory address from which responsive data is to be read with data read from the address in the storage medium, wherein the first memory address specified in the first incoming read command differs from the second memory address specified in the second incoming read command.

The first, second, third, fourth, and other aspects can include one or more of the following features. A human-portable data processing device can also include a writeable storage medium. An emulation data generation component can include a population component configured to populate the writeable storage medium with the emulation data. A bus controller can be configured to respond to at least two different incoming read commands specifying different addresses from which the data is to be read with emulation data drawn from a single address of the writeable storage medium. An emulation data generation component can include an application performed by the one or more data processors. A bus controller can also include a communication mechanism for communicating with the application. A communication mechanism can be configured to communicate an amount of data requested by the incoming read command to the application. An emulation data generation component can include an application being executed on the one or more data processors and a storage population component configured to populate the storage medium with data output by the application. An emulation data generation component can also include a communication mechanism configured to receive a characterization of the amount of data requested by the incoming read command. A data processing device can also include a housing, wherein the one or more data processors, the incoming message classifier, the emulation data generation component, and the bus controller are all housed in the housing. An emulation data generation component can include debugging software. An incoming message classifier can be configured to classify the address of the incoming read command according to a section of a file system requested by the incoming read command. A data processing device can also include a storage population component configured to populate the storage medium with data drawn from one of a second storage medium in the data processing device, a hardware component of the data processing device, or an application executed by the one or more data processors. A data processing device can also include a communication mechanism between the bus controller and the storage population component, wherein the communication mechanism is configured to communicate an amount of data requested by the incoming read command to the storage population component. A first incoming read command can specify a first section of a file system and the second incoming read command specifies a second section of the file system. Data at the address in the storage medium need not be stored in accordance with the file system. A bus controller can be configured to respond to the enumeration requests with responses characterizing the data processing device as a mass storage device. A response to the incoming read command can include both the emulation data generated in response to the incoming read command and data which existed on the human-portable data processing device prior to receipt of the read command. An emulation data can include a pointer to another data cluster. Data which existed on the human-portable data processing device prior to receipt of the read command can include data stored a location that differs from a location specified in the read command. A method can also include selecting, by the human-portable data processing device, to read the emulation data from a first address, and selecting, by the human-portable data processing device, to read the data which existed on the human-portable data processing device prior to receipt of the read command from a second address. A first address is not contiguous with the second address. Generating the emulation data can include successively generating batches of emulation data that each match an amount of data that is to be included in successive responses to incoming read commands.

The details of one or more implementations are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
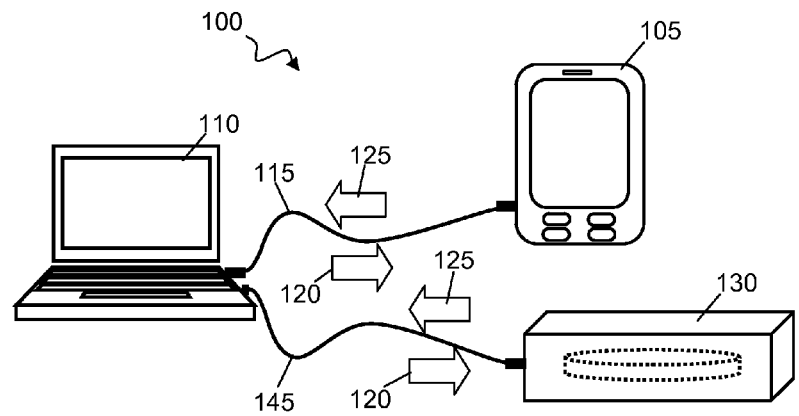
FIG. 1 is a schematic representation of a system in which a portable data processing device emulates a mass storage device.

FIG. 1 is a schematic representation of a system 100 in which a portable data processing device 105 emulates a mass storage device. In addition to portable device 105, system 100 includes computer system 110 and a mass storage device 130. A wired connection 115 is formed between portable device 105 and computer system 110. A wired connection 145 is formed between portable device 105 and mass storage device 130.

Portable device 105 is a human-portable device that includes one or more data processors that perform operations in accordance with machine-readable instructions. Portable device 105 can be, e.g., a personal/enterprise digital assistant, a mobile phone, a game console, a pad device, or the like. Portable device 105 can include various components that provide different functionality, such as one or more wireless transceivers (including phone transceivers), accelerometers, a GPS device, a digital camera, and the like. The components, and the one or more data processors, can be housed together in a single housing. The housing can be small enough to allow portable device 105 to be held in a single hand, i.e., portable device 105 can be a handheld device.

Computer system 110 is a system of one or more data processing devices that perform operations in accordance with machine-readable instructions. In the illustrated instance, host computer system 110 is shown as a laptop computer, but computer system 110 can also be desktop computer, a pad computer, or another portable device.

Mass storage device 130 is a device for storing relatively large amounts of data. In the illustrated implementation, mass storage device 130 is a peripheral device that is not integrated into computer system 110. Mass storage device 130 can be, e.g., an external magnetic hard drive. Computer system 110 exchanges information with mass storage device 130 over wired connection 145. In particular, wired connection 145 can carry messages 120 from computer system 110 to mass storage device 130 and messages 125 from mass storage device 130 to computer system 110. Messages 125 can include data read from portable mass storage device 130 by computer system 110. Computer system 110 supports one or more file systems for accessing data stored in mass storage device 130. For example, host computer system 110 can support one or more FAT file systems. Such files systems can be used in reading data from mass storage device 130.

In some implementations, computer system 110 acts a host (or master) device that controls the relationship with mass storage device 130. Such a host computer system 110 can include a host controller that formats outgoing messages 120 for transmission over wired connection 115 and formats incoming messages 125 for use in computer system 110. The host controller is generally implemented in hardware and is configured to issue events that identify and manage message exchange with mass storage device 130, issue requests for status information regarding mass storage device 130, issue requests that mass storage device 130 perform specified activities, and issue read and write commands (e.g., SCSI commands). In some implementations, the host controller can be a USB host controller and wired connection 145 can be a USB bus. The host controller is generally embedded in a microcontroller chip or on a separate chip that interfaces with the one or more data processing devices of computer system 110.

Computer system 110 can exchange information with portable device 105 over wired connection 115 by attempting to read from portable device 105 in the same way that it reads from mass storage device 130 over wired connection 145. Computer system 110 can exchange this information without recognizing that the data in outgoing message 125 is not actually stored using the file system that computer system 110 is attempting to read. Thus, wired connection 115 can carry messages 120 from computer system 110 to portable device 105 and messages 125 from portable device 105 to computer system 110. Messages 125 can include data read from portable data processing device 105 by computer system 110 as if portable data processing device 105 were a mass storage device. Thus, the support for computer system 110 for reading from one or more file systems for accessing data stored in mass storage device 130 (or other mass storage device) can be used in reading data from portable data processing device 105.

In some implementations, computer system 110 acts a host (or master) device that controls the relationship with portable device 105. Such a host computer system 110 can include a host controller that formats outgoing messages 120 for transmission over wired connection 115 and formats incoming messages 125 for use in computer system 110. The host controller is generally implemented in hardware and is configured to issue events that identify and manage message exchange with portable device 105, issue requests for status information regarding portable device 105, issue requests that portable device 105 perform specified activities, and issue read and write commands (e.g., SCSI commands). In some implementations, the host controller can be a USB host controller and wired connection 115 can be a USB bus. The host controller is generally embedded in a microcontroller chip or on a separate chip that interfaces with the one or more data processing devices of computer system 110.

Figure 2:
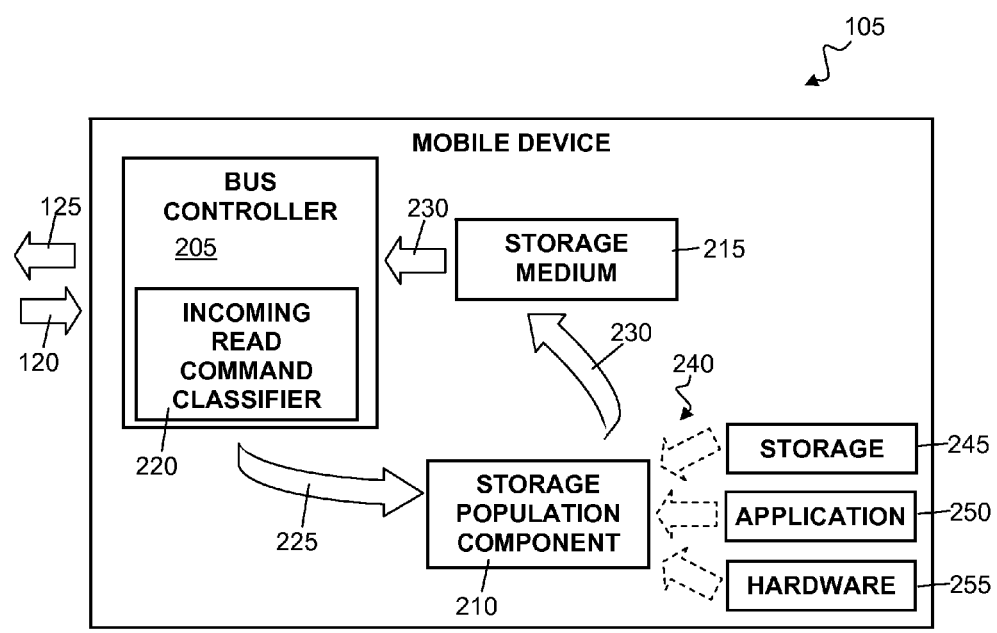
FIG. 2 is a schematic representation of a portable data processing device that emulates a mass storage device.

FIG. 2 is a schematic representation of a portable data processing device 105 that emulates a mass storage device. In the illustrated implementation, portable data processing device 105 includes a bus controller 205, a storage medium population component 210, and a rewriteable storage medium 215. Bus controller 205 formats outgoing messages 125 for transmission over wired connection 115 and formats incoming messages 120 for use in portable device 105. Bus controller 205 is generally implemented in hardware, alone or in combination with firmware stored in non-volatile memory. Bus controller 205 is configured to respond to events that identify and manage message exchange with computer system 110, respond to requests for status information from computer system 110, respond to requests from computer system 110 that portable device 105 perform specified activities, and respond to read and write commands (e.g., SCSI commands).

In some implementations, in performing such operations, bus controller 205 can emulate a slave device controller that is matched to the host controller of computer system 110. For example, if computer system 110 includes a USB host controller, bus controller 205 can emulate USB device-controller hardware. In some implementations, bus controller 205 may also be able to provide functionality that mimics the functionality of a microcontroller that interfaces with USB device-controller hardware, as described further below.

Bus controller 205 includes an incoming read command classification component 220. Incoming read command classification component 220 is a component that classifies incoming read commands from computer system 110. Read commands are commands that data be read from a device and specify a memory address from which the data is to be read. The memory address can be specified, e.g., using a storage volume number and a block address (e.g., as in SCSI read commands). Incoming message classification component 220 can be implemented in hardware, in software, or in combinations thereof.

Incoming read command classification component 220 is configured to classify read commands according to the memory address that is to be read. In particular, based on the memory address that is to be read, incoming read command classification component 220 can generate and output a classification 225 that indicates a category of the data that is requested. The category can be determined based on the section of the file system in which the memory address that is to be read is found and the file system from which computer system 110 is attempting to read. For example, the incoming read command can be classified as:

a command that the boot sector be read;
a command that the FAT region be read;
a command that the root directory be read;
a command that the data region be read; or
a command that extends beyond the end of the data region, if computer system 110 is attempting to read from a FAT file system. The file system from which computer system 110 is attempting to read can be determined, e.g., from data (i.e., a flag or frame format) in the read message or elsewhere. Incoming read command classification component 220 can be implemented in hardware, in software, or in combinations thereof.

Incoming read command classification component 220 outputs classification 225 to storage population component 210. Storage population component 210 is a component that is configured to populate storage medium 215 with data 230 according to classification 225. In particular, storage population component 210 populates storage medium 215 with data 230 of the category that is requested by the incoming read command. For example, in the context of a FAT file system read command, storage population component 210 populates storage medium 215 with data 230 resembling boot sector data (e.g., data resembling a BIOS Parameter Block and the operating system's boot loader code) in response to a command that the boot sector be read. Storage population component 210 populates storage medium 215 with data 230 resembling copies of a File Allocation Table in response to a command that the FAT region be read. Storage population component 210 populates storage medium 215 with data 230 resembling a directory table in response to a command that the root directory region be read. Storage population component 210 populates storage medium 215 with data 230 resembling an actual file and directory data in response to a command that the data region be read. Storage population component 210 populates storage medium 215 with zeros in response to a command that data extending beyond the end of the data region be read.

Storage population component 210 can be implemented in hardware, in software, or in combinations thereof. In the illustrated implementation, storage population component 210 is shown implemented outside of bus controller 205. In other implementations, storage population component 210 can be integrated into bus controller 205.

Storage population component 210 gathers data 230 from input 240 derived from one or more of other data storage locations 245, applications 250, and/or hardware 255 of portable data processing device 105. Data storage locations 245 can be found at a different location in storage medium 215 or in one or more other storage media. For example, in some implementations, input 240 can be data that is stored on portable data processing device 105 and that is to be backed-up on computer system 110. Storage population component 210 can populate storage medium 215 with data 230 in response to a series of read requests, thereby making the data stored on portable data processing device 105 accessible to computer system 110 without requiring that it be stored on portable data processing device 105 in a file system that is supported by computer system 110.

Applications 250 are collections of data processing activities that are performed by one or more data processors of portable data processing device 105 in accordance with machine-readable instructions. Example applications 250 include word and text processing applications, electronic mail and other communication applications, debugging applications, power consumption tracking applications, and network monitoring applications. In some instances, applications 250 can generate relatively large amounts of output data, such as relatively large traces of data processing activities in programs which are being debugged. Storage population component 210 can populate storage medium 215 with such output data 230 (e.g., as it is generated by an application 250), thereby reducing the data storage requirement of portable data processing device 105.

Hardware 255 includes one or more components of portable data processing device 105 that output data. Examples of hardware 255 include accelerometers, touchscreens, GPS systems, and other components. Storage population component 210 can populate storage medium 215 with output data 230 that characterizes the output of hardware 255 (e.g., in some instances, as it is output from hardware 255), thereby providing a mechanism for data transfer from hardware 255 to computer system 110.

In some implementations, storage population component 210 also notifies bus controller 205 that the population of storage medium 215 with the appropriate data 230 has been completed. In some implementations, storage population component 210 can also provide bus controller 205 with additional information characterizing the population of storage medium 215 by data 230. For example, storage population component 210 can provide bus controller 205 with an identification of the memory locations in storage medium 215 that have been populated, the amount of data 230 that was used to populate storage medium 215, and/or error checking or other information characterizing the population of storage medium 215 by data 230.

In some implementations, storage population component 210 need not identify the memory locations in storage medium 215 that have been populated to bus controller 205. For example, in some implementations, storage population component 210 can always populate the same memory locations in storage medium 215 with data. Bus controller 205 can then always read from that same memory location regardless of the memory address specified by the read command. In contrast, in implementations where storage population component 210 identifies the memory locations in storage medium 215 that have been populated to bus controller 205, bus controller 205 can read from the identified memory locations.

In any case, bus controller 205 formats and sends an outgoing message 125 in response to the read command. The outgoing message includes data 230 from storage medium 215. Since data 230 is of the category that is requested by the incoming read command, the outgoing message 125 includes data of that category and responsive to the read command. The outgoing message is formatted in accordance with communication specification (e.g., a USB specification) and a file system (e.g., a FAT file system) that are supported by computer system 110. Computer system 110 need not recognize, e.g., that the data in outgoing message 125 is not actually stored using the file system that computer system 110 attempts to read on portable data processing device 105.

Figure 3:
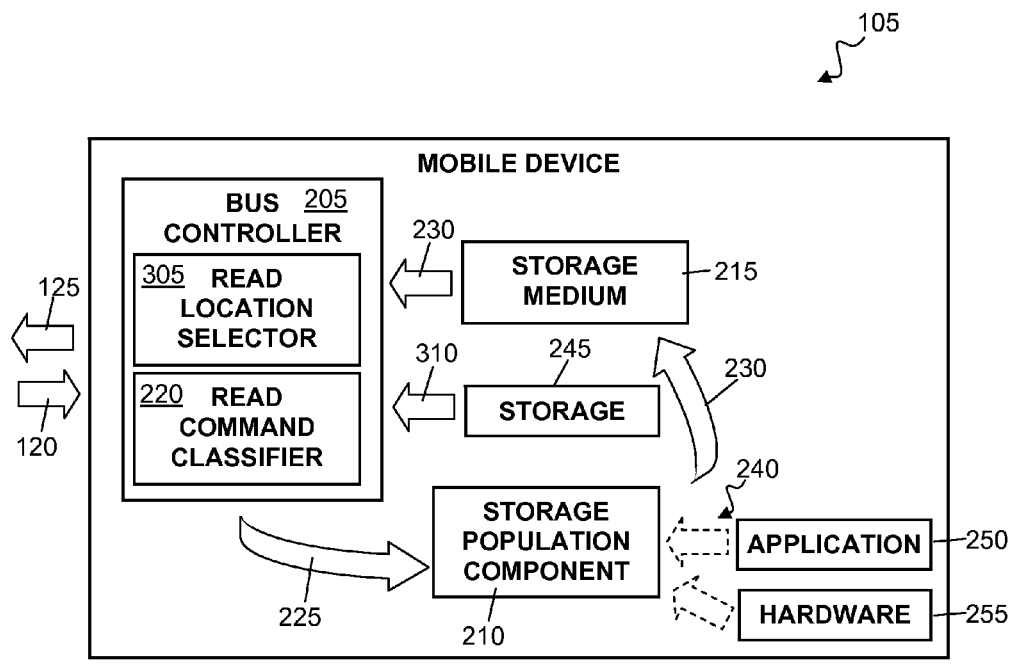
FIG. 3 is a schematic representation of a portable data processing device that emulates a mass storage device.

FIG. 3 is a schematic representation of a portable data processing device 105 that emulates a mass storage device. In the illustrated implementation, bus controller 205 of portable data processing device 105 also includes a read location selection component 305. Read location selection component 305 is a component that selects the location from which to read data is that is to be included in an outgoing message 125 that is responsive to a read command. Read location selection component 305 can be implemented in hardware, in software, or in combinations thereof.

In operation, read location selection component 305 receives classifications of incoming read commands from incoming read command classification component 220 and selects one or more memory locations of portable data processing device 105 from which data 230, 310 is read in responding to the read command. In effect, the memory address specified in the read command is used to classify the read command and an alternative read location is selected by selection component 305 based on the classification.

Read location selection component 305 generally selects memory locations that are populated by storage population component 210 in response to some classifications of an incoming read command and other memory locations in response to other classifications of an incoming read command by incoming read command classification component 220. For example, in some implementations in contexts where computer system 110 is attempting to read a FAT file system on portable data processing device 105, read location selection component 305 selects memory locations in storage medium 215 that are populated with data 230 by storage population component 210 in response to read commands specifying that the boot sector, the FAT region, the root directory, and/or the locations beyond the end of the data region be read. Read location selection component 305 selects data storage locations 245 that store data 310 in response to read commands specifying that a data region be read. As described previously, data storage locations 245 can be found at a different location in storage medium 215 or in one or more other storage media.

In some implementations, read location selection component 305 can select multiple memory locations for responding to a single incoming read command. The memory locations can include memory locations in storage medium 215 that are populated with data 230 by storage population component 210 and other memory locations with data 310 that is not populated by storage population component 210. In some implementations, multiple memory locations can be selected in response to a classification of the incoming read command by incoming read command classification component 220. For example, in some implementations, read location selection component 305 selects multiple memory locations in response to read commands specifying that locations which extend beyond the end of the data region be read. For example, data 310 which would be within the data region can be read from data storage locations 245 but data 230 which would be outside the end of the data region can be read from memory locations in storage medium 215 that are populated by storage population component 210.

In implementations of portable data processing device 105 that include a read location selection component 305, storage population component 210 need not populate storage medium 215 with data 230 for responding to certain read commands. For example, if a read command is to be answered using only data 310, storage population component 210 need not populate storage medium 215 with any data 230.

In any case, bus controller 205 formats outgoing message 125 using the selected of data 230, 310 to respond to the read command. The outgoing message is formatted in accordance with communication specification (e.g., a USB specification) and a file system (e.g., a FAT file system) that are supported by computer system 110. Computer system 110 need not recognize, e.g., that the data in outgoing message 125 is not actually stored in the file system that computer system 110 attempts to read on portable data processing device 105.

Figure 4:
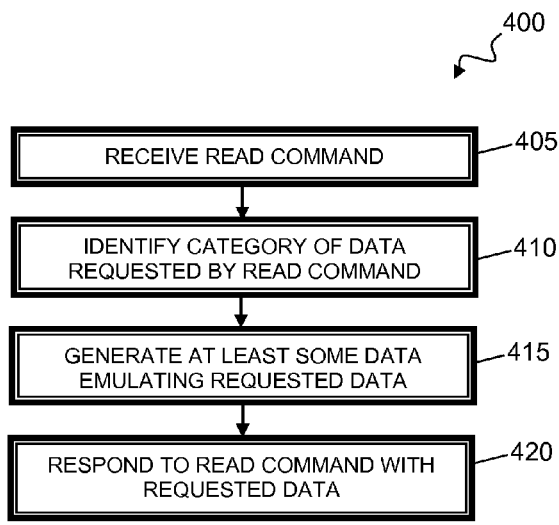
FIG. 4 is a flowchart of a process for emulating a mass storage device.

FIG. 4 is a flowchart of a process 400 for emulating a mass storage device. Process 400 can be performed by a system of one or more data processors that perform operations in accordance with the logic of a set of machine-readable instructions. For example, process 400 can be performed by one or more data processors in portable device 105 in system 100. Process 400 can be performed in isolation or in conjunction with other activities. Process 400 can be performed by a device that is emulating a mass storage device that organizes files and directories in accordance with a FAT or other file system.

The system performing process 400 receives a read command commanding that data on the system can be read at block 405. The read command can specify a memory address from which the data is to be read. The data address can be specified by the device that issued the read command in accordance with a file system that the issuing device is attempting to read on the system performing process 400. For example, the data address can be specified by the issuing device based on a response to an enumeration request that indicates that the system performing process 400 organizes directories and files in accordance with a FAT file system.

The system performing process 400 identifies a category of the data requested by the read command at block 410. The category of the data requested can reflect the role that the requested data plays in the file system that is being emulated by the system performing process 400. For example, the requested data can include data characterizing the physical layout of the emulated data storage volume (e.g., a BIOS Parameter Block), data characterizing a number of reserved sectors, data that characterizes a sequence of non-contiguous blocks of storage (e.g., entries in a File Allocation Table), data characterizing a name, extension, attributes, the date and time of creation, and addresses of one or more files or directories (e.g., a directory table), actual file data, and data beyond the end of file data.

The category of the data requested can be identified in a number of different ways. For example, in some implementations, the first data read command in a series of read commands can be identified, by default, as commanding that data characterizing the physical layout of the emulated data storage volume (e.g., a boot sector) be read. As another example, a previous read command may request data specifying the sequence of non-contiguous blocks of storage of a file. A series of data read commands that specifies the same sequence of non-contiguous blocks can be identified as a series of file data read commands directed to reading that same file.

The system performing process 400 generates at least some data that emulates the data requested by the read command at block 415. The emulation data can be generated dynamically, i.e., in response to the categorization of the read command. The categorization of the read command can be used as a trigger for the generation of the emulation data.

Emulation data can be generated in a number of different ways. For example, the system performing process 400 can repeatedly fill memory locations of a relatively small buffer (e.g., a 512 byte buffer) with data that resembles the data which would be found in a larger storage that is organized in accordance with a file system which is supported by the device which issued the read command. In some implementations, the system performing process 400 can repeatedly fill a buffer with data that resembles the storage of a single, unfragmented file in accordance with a supported file system. For example, a first data cluster of emulation file data can be generated in response to a read command to point to an allegedly adjacent, succeeding data cluster. The second data cluster can itself be generated in response to another read command and point to yet another allegedly adjacent, succeeding cluster.

In some implementations, the system performing process 400 does not generate all of the data requested by the read command in response to the read command. Instead, the system performing process 400 can generate a proper subset of the data requested by the read command. For example, a pointer that points to an allegedly adjacent, succeeding data cluster can be generated and used in conjunction with existing data stored elsewhere on the device performing process 400 to respond to the read command.

The emulation data can be generated by the system performing process 400 using one or more applications. For example, in some implementations, a proper subset of the emulation data can be generated by a bus controller in accordance with a file system supported by the issuer of the read command whereas a different proper subset of the emulation data can be generated by a second application such as, e.g., a debugging application. The software applications can use one or more communication protocols or other mechanism for coordinating their operations. For example, a bus controller can indicate the amount of emulation data from such a second application that is to be included in each response to a read command. In some implementations, successive batches of emulation data that match the amount of data that is to be included in each response can be generated. As another example, such a second application can indicate to the bus controller that all of the emulation data that the second application will generate has already been read by the issuer of the read command(s).

The system performing process 400 responds to the read command at block 420. The response to the read command generally includes at least some of the emulation data generated in block 415, but in some instances the response can include failing to respond (i.e., a stall). By responding, the system performing process 400 deceives the issuer of the read command since the emulation data was not actually stored in the file system that the issuer of the read command was attempting to ready at the time the read command was issued. In general, the response to the read command also includes a tag that identifies the read command to which the response is responsive and a description of the length of the response.

If necessary, the system performing process 400 assembles the response to the read command from multiple memory devices or from non-contiguous memory locations. For example, the system performing process 400 can draw a first proper subset of the data in the response from a first memory location and a second proper subset of the data in the response from a second memory location.

Figure 5:
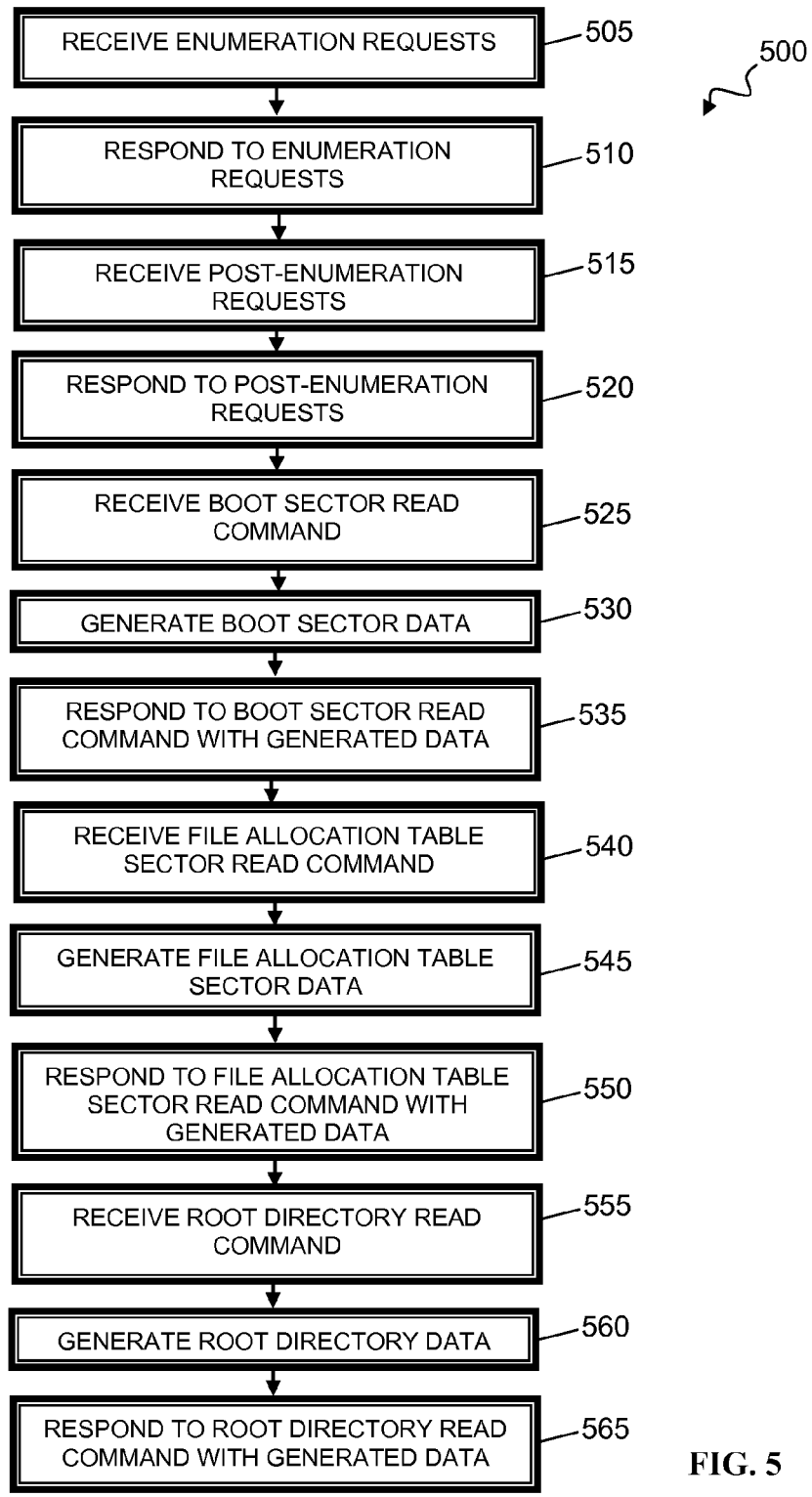
FIG. 5 is a flowchart of a process for emulating a mass storage device.

FIG. 5 is a flowchart of a process 500 for emulating a mass storage device. Process 500 can be performed by a system of one or more data processors that perform operations in accordance with the logic of a set of machine-readable instructions. For example, process 500 can be performed by one or more data processors in portable device 105 in system 100. Process 500 can be performed in isolation or in conjunction with other activities. For example, process 500 can be performed as part of process 400 (FIG. 4). Process 500 can be performed by a device that is emulating a mass storage device that organizes files and directories in accordance with a FAT or other file system.

The system performing process 500 receives one or more enumeration requests at block 505. The enumeration requests can request that data characterizing the system performing process 500 be provided. For example, the enumeration requests can request that a bus address of the system performing process 500 be set and/or device, configuration, and/or subordinate descriptors (including the interface and endpoint descriptors) of the system performing process 500 be provided.

The system performing process 500 responds to the enumeration requests at block 510. The responses need not be strictly true since the system performing process 500 is only emulating a mass storage device. For example, the system performing process 500 can return a device descriptor that incorrectly identifies the system performing process 500 as a mass storage device. If appropriate, the system performing process 500 can respond to enumeration requests with responses indicating that data is to be transferred from the system performing process 500 in a bulk transfer mode.

In some instances, the system performing process 500 can also receive one or more post-enumeration requests at block 515. Post-enumeration requests are requests relating to mass-storage functions of the receiving device. The responses to post-enumeration requests allow the request issuer read and write to the storage media. One example of a post-enumeration request is a read format capacity request that requests a descriptor of the number of blocks and their length in the system performing process 500. Another example of post-enumeration request is a read capacity request that requests the highest block address supported by a logical unit of the system performing process 500.

The system performing process 500 responds to the post-enumeration requests at block 520. The responses need not be strictly true since the system performing process 500 is only emulating a mass storage device. For example, the system performing process 500 can return responses that mischaracterize the formatting and addresses of the system performing process 500.

The system performing process 500 receives a boot sector read command at block 525. The boot sector read command is a command that the boot sector of the system performing process 500 be read. The boot sector read command can specify that data be read from the memory location where the boot sector of the system performing process 500 would have been located if the system performing process 500 were actually a mass storage device as characterized in the responses to the enumeration and post-enumeration requests.

The system performing process 500 generates boot sector data at block 530. The generated boot sector data emulates data that would have been located in the boot sector if the system performing process 500 were actually a mass storage device as characterized in the responses to the enumeration and post-enumeration requests. The system performing process 500 can also respond to the boot sector read command with the generated boot sector data at block 535.

The system performing process 500 receives a file allocation table sector read command at block 540. The file allocation table sector read command is a command that the file allocation table sector of the system performing process 500 be read. The file allocation table sector read command can specify that data be read from the memory location where the file allocation table sector of the system performing process 500 would have been located if the system performing process 500 were actually a mass storage device as characterized in the responses to the enumeration and post-enumeration requests.

The system performing process 500 generates file allocation table sector data at block 545. The generated file allocation table sector data emulates data that would have been located in the file allocation table sector if the system performing process 500 were actually a mass storage device as characterized in the responses to the enumeration and post-enumeration requests. The system performing process 500 can also respond to the file allocation table sector read command with the generated file allocation table sector data at block 550.

The system performing process 500 receives a root directory read command at block 555. The root directory read command is a command that the root directory of the system performing process 500 be read. The root directory read command can specify that data be read from the memory location where the root directory of the system performing process 500 would have been located if the system performing process 500 were actually a mass storage device as characterized in the responses to the enumeration and post-enumeration requests.

The system performing process 500 generates root directory data at block 560. The generated root directory data emulates data that would have been located in the root directory if the system performing process 500 were actually a mass storage device as characterized in the responses to the enumeration and post-enumeration requests. The system performing process 500 can also respond to the root directory read command with the generated root directory data at block 565.

The subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a portable audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   transferring data from a human-portable data processing device to a data processing system, comprising:
   classifying, by the human-portable data processing device, incoming read commands according to a section of a file system in which the data requested by the incoming read commands would have been found were the file system used at the human-portable data processing device;
   generating, by the human-portable data processing device in response to the incoming read commands, emulation data that emulates data which would have been found in the section of the file system; and
   responding, by the human-portable data processing device, to the incoming read commands with responses that include the emulation data
   wherein responding to the incoming read commands comprises responding to a first incoming read command that specifies a first memory address from which responsive data is to be read with data read from an address in the storage medium and responding to a second incoming read command that specifies a second memory address from which responsive data is to be read with data read from the address in the storage medium, wherein the first memory address specified in the first incoming read command differs from the second memory address specified in the second incoming read command.

2. The method of claim 1, wherein the response to at least some of the incoming read commands comprises both the emulation data generated in response to the at least some of the incoming read commands and data which existed on the human-portable data processing device prior to receipt of the at least some of the read commands.

3. The method of claim 2, wherein the emulation data comprises a pointer to another data cluster.

4. The method of claim 2, wherein the data which existed on the human-portable data processing device prior to receipt of the at least some of the read commands comprises data stored a location that differs from a location specified in the at least some of the read commands.

5. The method of claim 2, further comprising:
   selecting, by the human-portable data processing device, to read the emulation data from a first address; and
   selecting, by the human-portable data processing device, to read the data which existed on the human-portable data processing device prior to receipt of the read command from a second address,
   wherein the first address is not contiguous with the second address.

6. The method of claim 2, wherein generating the emulation data comprises successively generating batches of emulation data that each match an amount of data that is to be included in successive responses to the incoming read commands.

7. A human-portable data processing device comprising:
   a writeable storage medium;
   one or more data processors that perform operations in accordance with machine-readable instructions;
   an emulation data generation component connected to respond to classification of an incoming read command to generate emulation data emulating that which would have been read by the incoming read command were the human-portable data processing device a mass storage device, wherein the emulation data generation component comprises a population component configured to populate the writeable storage medium with the emulation data and
   a bus controller configured to perform operations, the operations comprising:
   classifying an incoming read command according to a section of a file system in which the data requested by the incoming read command would have been found were the file system used at the human-portable data processing device;
   and
   responding to the incoming read command with a response that includes the emulation data,
   wherein the bus controller is configured to respond to at least two different incoming read commands specifying different addresses from which the data is to be read with emulation data drawn from a single address of the writeable storage medium.

8. The human-portable data processing device of claim 7, wherein the response to at least some of the incoming read commands comprise both the emulation data generated in response to the at least some of the incoming read commands and data which existed on the human-portable data processing device prior to receipt of the at least some of the read commands.

9. The human-portable data processing device of claim 8, wherein the emulation data comprises a pointer to another data cluster.

10. The human-portable data processing device of claim 8, wherein the data which existed on the human-portable data processing device prior to receipt of the at least some of the read commands comprises data stored a location that differs from a location specified in the at least some of the read commands.

11. The human-portable data processing device of claim 8, wherein the operations further comprise:
    selecting to read the emulation data from a first address; and
    selecting to read the data which existed on the human-portable data processing device prior to receipt of the read command from a second address,
    wherein the first address is not contiguous with the second address.

12. The human-portable data processing device of claim 8, wherein generating the emulation data comprises successively generating batches of emulation data that each match an amount of data that is to be included in successive responses to incoming read commands.

13. The human-portable data processing device of claim 7, wherein the emulation data generation component comprises debugging software.

14. The human-portable data processing device of claim 7, further comprising an incoming message classifier is configured to classify the address of the incoming read command according to a section of a file system requested by the incoming read command.

15. A human-portable data processing device comprising:
an emulation data generation component connected to respond to classification of an incoming read command to generate emulation data emulating that which would have been read by the incoming read command were the human-portable data processing device a mass storage device; and
a bus controller configured to
classify incoming read commands according to a section of a file system in which the data requested by the incoming read commands would have been found were the file system used at the human-portable data processing device; and
respond to the incoming read command with a response that includes the emulation data,
wherein the bus controller is configured to respond to a first incoming read command that specifies a first memory address from which responsive data is to be read with data read from an address in the storage medium and to
respond to a second incoming read command that specifies a second memory address from which responsive data is to be read with data read from the address in the storage medium, wherein the first memory address specified in the first incoming read command differs from the second memory address specified in the second incoming read command.

16. The human-portable data processing device of claim 15, wherein the first incoming read command specifies a first section of a file system and the second incoming read command specifies a second section of the file system, wherein the data at the address in the storage medium is not stored in accordance with the file system.

17. The human-portable data processing device of claim 15, wherein the bus controller is configured to respond to the enumeration requests with responses characterizing the data processing device as a mass storage device.

18. The method of claim 1, further comprising:
populating memory locations with the generated emulation data; and
triggering the responding to the incoming read command in response to the populating of the memory locations being completed.

19. The method of claim 1, wherein the generating the emulation data comprises performing one or more of a word and text processing application, a communication application, a debugging application, a power consumption tracking application, and a network monitoring application.

* * * * *

UNITED STATES PATENT AND TRADEMARK OFFICE
CERTIFICATE OF CORRECTION

PATENT NO. : 8,265,919 B1
APPLICATION NO. : 13/249671
DATED : September 11, 2012
INVENTOR(S) : Jean Baptiste Maurice Queru It is certified that error appears in the above-identified patent and that said Letters Patent is hereby corrected as shown below:

IN THE CLAIMS:

Column 16, line 14, claim 7: delete "data and" and insert --data; and--.

Signed and Sealed this
Twentieth Day of November, 2012

David J. Kappos
*Director of the United States Patent and Trademark Office*